United States Patent [19]

Eling

[11] Patent Number: 5,447,965
[45] Date of Patent: Sep. 5, 1995

[54] METHOD FOR THE PREPARATION OF FLEXIBLE POLYMERIC FOAMS

[75] Inventor: Berend Eling, Bertem, Belgium

[73] Assignee: Imperial Chemical Industries plc, London, England

[21] Appl. No.: 241,545

[22] Filed: May 12, 1994

Related U.S. Application Data

[63] Continuation-in-part of Ser. No. 129,566, Sep. 30, 1993.

[30] Foreign Application Priority Data

Jun. 2, 1993 [GB] United Kingdom ............... 9311345

[51] Int. Cl.⁶ .................................. C08G 18/10
[52] U.S. Cl. ...................... 521/159; 521/174
[58] Field of Search .................... 521/174, 159

[56] References Cited

U.S. PATENT DOCUMENTS

| | | | |
|---|---|---|---|
| 4,144,386 | 3/1979 | Consoli et al. | 521/160 |
| 4,191,815 | 3/1980 | Jourquin et al. | 521/51 |
| 4,292,412 | 9/1981 | Wood | 521/107 |
| 4,544,678 | 10/1985 | Fesman | 521/107 |
| 5,084,486 | 1/1992 | Patten et al. | 521/126 |
| 5,098,937 | 3/1992 | Gallo et al. | 521/167 |

FOREIGN PATENT DOCUMENTS

| | | |
|---|---|---|
| 0442631 | 8/1991 | European Pat. Off. . |
| 0459622 | 12/1991 | European Pat. Off. . |
| 0480583 | 4/1992 | European Pat. Off. . |
| 0495156 | 7/1992 | European Pat. Off. . |
| 0231214 | 12/1985 | Germany . |
| 0297829 | 1/1992 | Germany . |
| 53-106798 | 6/1984 | Japan . |
| 1339442 | 12/1973 | United Kingdom . |
| 1396300 | 6/1975 | United Kingdom . |
| 1341710 | 12/1983 | United Kingdom . |

*Primary Examiner*—Morton Foelak

[57] ABSTRACT

A method for the preparation of a fexible polymeric foam by reacting a polyisocyanate component comprising an isocyanate-containing prepolymer having an NCO-content of from 2 to 15% by weight, with an isocyanate-reactive component comprising water and a polyoxyalkylene polyol having a high ethylene oxide and primary hydroxyl group content.

9 Claims, No Drawings

METHOD FOR THE PREPARATION OF FLEXIBLE POLYMERIC FOAMS

CROSS-REFERENCE RELATED APPLICATIONS

The present application is a continuation-in-part of co-pending application Ser. No. 08/129,566 filed Sep. 30, 1993 entitled "Method for the Preparation of Flexible Polymeric Foams".

This invention relates to a method for the preparation of flexible polymeric foams and reaction systems for preparing such foams.

The preparation of flexible polyisocyanate-based polymeric foams is well established.

U.S. Pat. No. 5,084,486 describes a process or the preparation of molded, high resiliency, PU-foams which comprises feeding at least 3 streams into a mixing device: a polyol-stream, a polyisocyanate-stream and a reactive third stream. Preferred polyisocyanates are MDI, TDI or mixtures thereof. In addition to water and a crosslinking/extending agent, the third stream also comprises a process/foam modifier, which preferably is a polyethylene oxide mono-ol or polyol. Suitable polyethylene oxides contain more than 50% by weight of ethylene oxide, have an equivalent weight ranging from 150 to 5000 and a hydroxyl functionality of 2 or greater.

In EP-A 442.631 a method for the preparation of flexible foams is described using a polyisocyanate component which comprises a low NCO isocyanate-terminated prepolymer. The isocyanate-reactive component comprises water, but may also contain isocyanate-reactive compounds having an equivalent weight below 500. However, the hardness of such foams is very often too high.

It has now been found that flexible foams having improved properties including reduced hardness and excellent hysteresis, ball rebound, compression set and dynamic fatigue, can be made by reacting a polyisocyanate component comprising a prepolymer with an isocyanate-reactive component which comprises water and a polyol having a high ethylene oxide and primary hydroxyl group content.

The addition of said polyol also provides advantages in processing since it increases the volume of the water stream and compatibilises water in the foam system. Furthermore, it can have an effect on the cell opening of the foams.

The present invention thus provides a method for the preparation of a flexible polymeric foam by reacting: (A) a polyisocyanate component comprising an isocyanate-containing prepolymer having an NCO content of from 2 to 15% by weight, and obtained by reacting an isocyanate-reactive polymer having an average nominal functionality of 2 to 8, an average equivalent weight in the range from 500 to 5000 and preferably an oxyethylene content of up to 30% by weight, with a stoichiometric excess of a polyisocyanate, with (B) an isocyanate-reactive component comprising water and a polyoxyalkylene polyol having an average nominal hydroxyl equivalent weight of from 100 to 1000, an oxyethylene content of at least 60% by weight and an average primary hydroxyl group content of at least 75%. The term "average nominal hydroxyl functionality" is used herein to indicate the average functionality (number of hydroxyl groups per molecule) of the polyol on the assumption that the average functionality of the polyoxyalkylene polyols is identical with the average functionality (number of active hydrogen atoms per molecule) of the initiator(s) used in their preparation although in practice it will often be somewhat less because of some terminal unsaturation. Isocyanate-containing prepolymer in this context is defined as the reaction product of excess polyisocyanate and polyol including the unreacted polyisocyanate and any polyisocyanate which is added after the reaction took place. The expression "methylene-bridged polyphenyl polyisocyanates" used herein is to be regarded as referring to diphenylmethane diisocyanates and polymethylene polyphenylene polyisocyanates having a functionality above 2, preferably above 2 and below 3 like "crude" and "polymeric" MDI.

The isocyanate containing prepolymer having an NCO content in the range from 2 to 15% by weight is obtained by reacting a polyoxyalkylene polyol having an average nominal hydroxyl functionality of 2 to 8, an average equivalent weight in the range from 500 to 5000 and an ethylene oxide content of up to 30% by weight with a stoichiometric excess of a polyisocyanate and in particular of a diphenylmethane diisocyanate composition.

Diphenylmethane diisocyanate compositions which may be used in the preparation of the prepolymer include "pure" MDI preferably containing at least 60% by weight of the 4,4-isomer. Suitable isocyanates therefore include the substantially pure 4,4-isomer and isomer mixtures containing not more than 40% preferably not more than 30%, and more preferably not more than 20%, by weight of the 2,4'-isomer and not more than 5% by weight of the 2,2'-isomer. Other suitable diphenylmethane diisocyanate compositions include modified forms of these diphenylmethane diisocyanates, that is to say MDI containing at least 60% by weight of the 4,4'-isomer modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Diphenylmethane diisocyanate compositions containing pure MDI and polymeric fillers may also be used in the preparation of the prepolymer. MDI compositions containing polymeric fillers have been described in the prior art and include polyurea dispersions in MDI and prepolymers based on MDI and polymer polyols containing dispersed polymer particles. In these products, it is generally preferred that the dispersed polymer particles have an average particles size of less than 50 microns.

Further diphenylmethane diisocyanate compositions which may be used in the preparation of the prepolymer include compositions containing polymethylene polyphenylene polyisocyanates. Thus, mixtures may be used containing at least 70% by weight of pure MDI and up to 30% by weight of the so-called crude MDI containing from 35 to 6by weight of diisocyanates, the remainder being largely poll/methylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the prepolymer include mixtures of the above described MDI types and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

Whereas a preferred embodiment of the invention involves the use of methylene-bridged polyphenyl polyisocyanates as disclosed hereabove, it should be clear that the invention is applicable for other polyisocyanates, such as in particular aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

The isocyanate-reactive polymer used in the preparation of the prepolymer has an average nominal hydroxyl functionality of 2 to 8, preferably 2 to 4, more preferably 2 to 3. Preferred average equivalent weights lie in the range from 750 to 5000, more particularly in the range from 1000 to 4000. Mixtures of two or more isocyanate-reactive polymers varying in functionality, equivalent weight and/or chemical constitution (end groups or backbone) may be used provided such mixtures conform to the average functionality and average equivalent weight criteria specified herein.

Isocyanate-reactive groups that may be present in the isocyanate-reactive polymer include primary amino, secondary amino, thiol, carboxy, imino, enamino and, especially, hydroxyl groups.

Particularly important isocyanate-reactive polymers include polymeric polyols. Suitable polyols and methods for their preparation have been fully described in the prior art and, as examples of such polyols, there may be mentioned polyesters, polyester-amides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Further particularly useful polyether polyols include polyoxypropylene diols and triols obtained by the simultaneous or sequential addition of ethylene and propylene oxides to dior trifunctional initiators as fully described in the prior art. Random copolymers, block copolymers and random/block copolymers having oxyethylene contents of up to 30%, based on the total weight of oxyalkylene units are preferred. Mixtures of the said diols and triols can be particularly useful. Other particularly useful polyether polyols include polytetramethylene glycols obtained by the polymerisation of tetrahydrofuran. Particularly useful are also mixtures of polypropylene-polyethylene oxide polyols with up to 5% of another polyol, for example a polyalkylene oxide, a polyester polyol, a polycarbonate polyol, a polyacetal polyol or a polytetramethylene glycol.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxy-ethyl) terephthalate, glycerol, trimethylolpropane, pentaerytritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polymeric polyols, for example polyether polyols, or by the in-situ reaction between a polyisocyanate and an amino- and/or hydroxyfunctional compound, such as triethanolamine, in a polymeric polyol.

Other useful isocyanate-reactive polymers for preparing the prepolymers include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Further isocyanate-reactive polymers which may be used in preparing the prepolymers include imino-functional polymers. Such polymers have been described in U.S. Pat. No. 4,794,129 together with methods for their preparation and include polymers terminating in imine, oxazoline, imidazoline, N-alkyl imidazoline, oxazine, diazine, imino-ester, amidine, imidine, isourea and guanidine groups. The preferred imino-functional polymers are imine-terminated polyethers such as may be obtained, for example by reacting a polyether polyamine, especially a polyoxypropylene diamine or triamine, with an aldehyde or ketone.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the $H_2O$ formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidising a primary hydroxy functional resins to the corresponding polycarboxylic acid, conversion of the said groups to orthoesters, end treatment of the latter, with an excess of a secondary amine. Each orthoester must contain at least one alpha hydrogen atom.

The isocyanate-containing prepolymer may be prepared by reacting the polyisocyanate composition with the isocyanate-reactive polymer under conditions that have been fully described in the prior art for the preparation of prepolymers. Reaction temperatures of about 40° to about 90° C. are generally suitable for the preparation of urethane group-containing prepolymers from polyols or urea group-containing prepolymers from polyamines but, if desired, the reaction may be continued under known conditions so as to convert urethane groups to allophanate groups and urea groups to biuret groups. To achieve a final NCO content within the range 2 to 15% by weight, an initial ratio of isocyanate to isocyanate-reactive groups (for example NCO/OH) would typically be within the range from 3:1 to 20:1. Preferred prepolymers are made by reacting the starting materials at an initial ratio of isocyanate to isocyanate-reactive groups in the range from 3.5:1 to 15:1, especially 4:1 to 10:1, to give prepolymers having NCO contents of 4 to 12%, especially 5 to 10% by weight. After the reaction took place one or more of the polyisocyanates mentioned before may be added to the reaction product. The amount of the polyisocyanates added should be such that the prepolymer still has an NCO content of 2 to 15% by weight.

The polyoxyalkylene polyols used in the isocyanate-reactive component suitably have an average nominal hydroxyl functionality of from 2 to 3, an average hydroxyl equivalent weight of from 100 to 1000, an oxyethylene content of at least 60% by weight and an average primary hydroxyl group content of at least 75%. Polyoxyalkylene diols are preferred.

The equivalent weight is preferably from 100 to 700 and most preferably from 200 to 500. Preferably the polyols have an oxyethylene content of at least 75% by weight and an average primary hydroxyl group content of at least 95%.

Most preferred are polyethylene glycols having an equivalent weight of from 200 to 500.

The isocyanate-reactive component preferably comprises from 10 to 90% by weight of water.

To effect foam formation, the polyisocyanate component is reacted with the isocyanate-reactive component in the presence as necessary of conventional additives which may for convenience be included in the isocyanate-reactive component or, if inert towards isocyanates, in the polyisocyanate component or as an additional stream.

Preferably the amount of the isocyanate-reactive component is from 1 to 20 parts by weight per 100 parts by weight of the polyisocyanate component.

The reaction is conducted at an index of from 30 to 125 preferably of from 50 to 100; the index being defined by the formula $$\text{index} = \frac{\text{equivalents of NCO} \times 100}{\text{equivalents of isocyanate-reactive groups}}$$

Suitable additives which can be present in the isocyanate-reactive component or, if inert towards isocyanates, in the polyisocyanate component include the catalysts commonly disclosed in the literature, such as for example tertiary amines and tin compounds, surface-active agents and foam stabilisers, for example siloxane-oxyalkylene copolymers, chain extenders, for example low molecular weight diols, diamines and diimines, crosslinking agents, for example triethanol-amine, flame retardants, organic and inorganic fillers, pigments and internal mould release agents.

Preferably water is used as the sole blowing agent. However, other blowing agents, such as halocarbons, may be present as well.

As is known producers of polyisocyanates, isocyanate containing prepolymers and polyols are often not producing the foams; they sell the above chemicals to a foam producer. Often a fully formulated reaction system is sold to a foam producer; i.e. a polyisocyanate composition and a polyol composition comprising all other ingredients, like blowing agent, catalysts etc, are sold as a reaction system in separate containers in order to allow the customer to make a specific foam by reacting the two compositions. This approach provides a relatively simple way to the customer to make a product from often a variety of chemicals by combining two compositions under appropriate conditions. A disadvantage of this approach is that the foam producer is limited in adapting the reaction system to his specific needs. Therefore it is considered advantageous in the context of the present invention not to provide a mixture of the prepolymer and the other polyisocyanate composition but rather to provide the prepolymer and the ocher polyisocyanate composition separately in a reaction system also comprising the isocyanate-reactive composition.

Consequently the invention is concerned with a reaction system comprising in separate containers (A) an isocyanate prepolymer having an NCO content of from 2 to 15% by weight and obtained by reacting an isocyanate-reactive polymer having an average nominal functionality of 2 to 8, an average equivalent weight in the range from 500 to 5000 and preferably an oxyethylene content of up to 30% by weight with a stoichiometric excess of a polyisocyanate, (55) a polyisocyanate having an NCO-content of more than 15% by weight and preferably of at least 20% by weight, (C) an isocyanate-reactive component comprising: (i) water, and (ii) a polyoxyalkyene polyol having an average nominal hydroxyl functionality of from 2 to 3, an average hydroxyl equivalent weight of from 100 to 1000, an oxyethylene content of at least 60% by weight and an average primary hydroxyl group content of at least 75%.

The relative amounts of (A), (B) and (C) are preferably such that the reaction system comprises at least 70% by weight of (A), calculated on the total weight of (A) and (B), and 1–20 parts by weight of (C), per 100 parts by weight of (A) and (B). Polyisocyanates (B) may be selected from those mentioned before.

Preferably the weight ratio water: polyoxyalkylene polyol in the isocyanate-reactive component ranges from 1:10 to 10:1.

The term "reaction system" is defined as a combination of ingredients for preparing the flexible foams according to the present invention which ingredients are kept in separate containers and which ingredients are sold and marketed for preparing said flexible foams.

The reaction system with the separate polyisocyanate compositions provides the foam producer with the opportunity to supply the polyisocyanate compositions independently from each other to the isocyanate-reactive composition. Therefore a preferred embodiment of the process according to the present invention is to bring the prepolymer and the other polyisocyanate composition independently from each other into contact with the isocyanate-reactive composition. In general this is conducted by providing a conducting device, like a pipe, from a container containing the prepolymer to a mixing head or a reaction zone of a device for making foams and a second conducting device from a container containing the other polyisocyanate composition to the said mixing head or reaction zone and a third conducting device from a container containing the isocyanate-reactive composition to the said mixing head or reaction zone. The important feature of the embodiment is providing the prepolymer and the other polyisocyanate composition from separate containers giving the foam producer the opportunity to adapt their relative amounts. It is within this embodiment to combine the first two conducting devices to one single conducting device just before or at the reaction zone or the mixing head. It is also within this embodiment to provide the first and the second conducting device from the respective containers to a mixing zone wherein the prepolymer and the other polyisocyanate composition are mixed and to provide a conducting device from this mixing zone to the said reaction zone or mixing head wherein the polyisocyanate component is brought into contact with the isocyanate-reactive composition.

Likewise the isocyanate-reactive ingredients could be provided to the reaction zone or the mixing head via more than one conducting device. However, it is advantageous and preferred in this invention to premix the water, the polyoxyalkylene polyol and optional additives and to supply the isocyanate-reactive component as a single stream to the reaction zone.

The method of the invention may be used to produce moulded or slabstock foam continuously, semi-continuously or batch-wise.

The invention is illustrated but not limited by the following examples in which all parts and percentages are by weight unless otherwise stated.

EXAMPLES 1–10

Flexible foams were made by hand-mixing the following ingredients:

| isocyanate component: | |
|---|---|
| isocyanate prepolymer | 85 pbw |
| other polyisocyanate | 15 pbw |
| isocyanate-reactive component: | |

-continued

| | |
|---|---|
| DMI (1,2-dimethyl-imidazole) | 0.33 pbw |
| SH 210 (silicon surfactant, Union Carbide) | 0.5 pbw |
| water | 2.96 pbw |
| polyol additive | 4.78 pbw |

The isocyanate prepolymer (NCO=7% by weight) is the reaction product of 25 pbw MDI containing 10% of 2,4'-isomer with 75 pbw of an oxyethylene/oxypropylene triol (15 wt % EO-tip) of OH-value 28.

The other polyisocyanate is a polymeric MDI (NCO=30% by weight), modified by reaction with 3 pbw of an oxyethylene/oxypropylene triol (78% wt random EO) of OH-value 42.

The isocyanate component was first prepared by blending the isocyanate prepolymer and the other polyisocyanate in a beaker.

The temperature of the constituents of the isocyanate component amounted to 45° C.

The isocyanate-reactive component was the prepared by premixing the components stated above and by adding at a temperature of 45° C. to the isocyanaze component with further mixing.

The polyol additives used are indicated in table I, as well as the physical properties of the foams obtained.

Examples 1–5 illustrate the invention, examples 6–10 are comparative examples.

TABLE 1

| Ex. | polyol additive | density (kg/m$^3$) | ball rebound (%) | Compression set CS 75 (%) | Hardness CLD 40% (kPa) | hysteresis |
|---|---|---|---|---|---|---|
| 1 | A | 41.2 | 55 | 5.0 | 2.8 | 26.3 |
| 2 | B | 39.2 | 55 | 4.0 | 2.9 | 27.0 |
| 3 | C | 39.5 | 56 | 3.9 | 2.8 | 27.1 |
| 4 | D | 37.8 | 59 | 3.0 | 2.7 | 25.0 |
| 5 | E | 41.6 | 59 | 1.0 | 3.4 | 25.0 |
| 6 | — | 37.8 | 48 | 6.9 | 4.3 | 34.0 |
| 7 | F | 40.2 | 50 | 3.0 | 3.7 | 31.8 |
| 8 | G | 42.9 | 57 | 3.0 | 4.0 | 26.3 |
| 9 | H | 37.6 | 47 | 5.9 | 3.5 | 33.0 |
| 10 | I | 37.3 | 47 | 5.0 | 3.9 | 34.0 |

Polyol additives
A: PEG 200 (100 wt % EO; 100% prim. hydroxyl groups)
B: PEG 400 (100 wt % EO; 100% prim. hydroxyl groups)
C: PEG 600 (100 wt % EO; 100% prim. hydroxyl groups)
D: PEG 1000 (100 wt % EO; 100% prim. hydroxyl groups)
E: polyoxyethylene triol (100 wt % EO; MW=750; 100% prim. hydroxyl groups)
F: PO-tipped PEG 600 (80 wt % EO; 25% prim. hydroxyl groups)
G: polyoxyethylene oxypropylene triol (78 wt% EO; MW=3900)
H: polyoxyethylene oxypropylene diol (50 wt% EO; MW=500)
I: polyoxyethylene oxypropylene triol (50 wt% EO; MW=750)

Density, ball rebound, compression set, hardness and hysteresis were measured according to ISO R1855, ISO/DIS8307, ISO 1856, ISO 3386/1 and ISO 3386/1 respectively.

From examples 1–5 it can be seen that, in comparison with example 6 (no polyol additive), the additives according to the invention improve ball rebound, compression set and hysteresis properties whereas the hardness is reduced. The increase in density due to the additives is relatively small. The use of high molecular weight additives (example 8) causes the foaming mix during foam rise to become instable and hence relatively high densities are obtained accompanied with hardly no hardness reduction. When the PO-content is relatively high (50wt %; example 9 & 10) the additives have hardly an effect on ball rebound and hysteresis properties and a limited effect on compression set and hardness. When the primary hydroxyl group content is relatively low (example 7) a limited effect on ball rebound, hardness and hysteresis is observed.

EXAMPLE 11-13

Flexible foams were made using the same formulations as in examples 1-10, except that PEG 600 was used as the polyol additive and the amounts of water and PEG 600 were varied as indicated in Table II.

TABLE II

| Ex. | amount of water (g) | amount of PEG 600 (g) | density (Kg/m$^3$) | ball rebound (%) | CS 75 (%) | CLD 40% (kPa) (%) | hysteresis |
|---|---|---|---|---|---|---|---|
| 11 | 3.03 | 3.19 | 39.0 | 51.4 | 5.6 | 4.0 | 30.8 |
| 12 | 2.89 | 6.38 | 39.4 | 57.0 | 3.0 | 2.8 | 26.7 |
| 13 | 2.82 | 7.97 | 40.6 | 60.6 | 3.0 | 2.7 | 23.4 |

From this series of foams it can be seen that the ball rebound, compression set and hysteresis improve with increasing amounts of PEG 600 in the foaming recipe.

I claim:

1. A method for the preparation of a flexible polymeric foam by reacting: (A) a polyisocyanate component comprising an isocyanate containing prepolymer having an NCO content of from 2 to 15% by weight and obtained by reacting an isocyanate-reactive polymer having an average nominal functionality of 2 to 8, an average equivalent weight in the range from 500 to 5000 and preferably an oxyethylene content of up to 30% by weight, with a stoichiometric excess of a polyisocyanate, with (B) an isocyanate-reactive component comprising water and a polyoxyalkylene polyol having an average nominal hydroxyl functionality of from 2 to 3, an average hydroxyl equivalent weight of from 100 to 1000, an oxyethylene content of at least 60% by weight and an average primary hydroxyl group content of at least 75%.

2. A method according to claim 1, characterised in that the amount of the isocyanate-reactive component is 1-20 parts by weight per 100 parts by weight of the polyisocyanate component.

3. A method according to claim 1, characterised in that the prepolymer is obtained from an aromatic polyisocyanate.

4. A method according to claim 1, characterised in that the polyoxyalkylene polyol has an average hydroxyl equivalent weight of from 100 to 700, an oxyethylene content of at least 75% by weight and an average primary hydroxyl group content of at least 95%.

5. A method according to claim 1 characterised in that the polyoxyalkylene polyol is a polyoxyalkylene diol.

6. A method according to claim 1 characterised in that the isocyanate-reactive component comprises 10 to 90% by weight of water.

7. Reaction system comprising in separate containers:
(A) an isocyanate containing prepolymer having an NCO content of from 2 to 15% by weight and obtained by reacting an isocyanate-reactive polymer having an average nominal functionality of 2 to 8, an average equivalent weight in the range from 500 to 5000 and preferably an oxyethylene content of up to 30% by weight, with a stoichiometric excess of a polyisocyanate,
(B) a polyisocyanate having an NCO-content of more than 15% by weight,
(C) an isocyanate-reactive component comprising:
(i) water, and
(ii) a polyoxyalkylene polyol having an average nominal hydroxyl functionality of from 2 to 3, an average hydroxyl equivalent weight of from 100 to 1000, an oxyethylene content of at lease 60% by weight and an average primary hydroxyl group content of at least 75%.

8. Reaction system according to claim 7, characterised in that it comprises at least 70% by weight of (A), calculated on the total weight of (A) and (B), and 1-20 parts by weight of (C), per 100 parts by weight of (A) and (B).

9. Reaction system according to claims 7, characterised in that (B) has an NCO-content of at least 20% by weight, (C) (ii) has an average hydroxyl equivalent weight of from 100 to 700, an oxyethylene content of at least 75% by weight and an average primary hydroxyl group content of at least 95%, and the weight ratio (C)(i):(C)(ii) ranges from 1:10 to 10:1.

* * * * *